Feb. 26, 1952 — A. O. C. NIER ET AL — 2,586,984
APPARATUS FOR GOVERNING FLUID FLOW
Filed Oct. 11, 1945

INVENTOR.
ALFRED O. C. NIER
RUDOLPH B. THORNESS
CHARLES M. STEVENS
BY

Patented Feb. 26, 1952

2,586,984

UNITED STATES PATENT OFFICE 2,586,984

APPARATUS FOR GOVERNING FLUID FLOW

Alfred O. C. Nier, Riverdale, and Rudolph B. Thorness and Charles M. Stevens, New York, N. Y., assignors, by mesne assignments, to the United States of America as represented by the United States Atomic Energy Commission Application October 11, 1945, Serial No. 621,849

3 Claims. (Cl. 138—46)

The present invention relates to means for regulating a flow of a small quantity of fluid, and more particularly to an apparatus for governing the quantity of a gas flowing from a source having a relatively high pressure to a destination having a low pressure.

One of the applications of a method and apparatus embodying the present invention pertains to the regulation of a gas being fed into a mass spectrometer, especially a mass spectrometer comprising a part of a system for constantly analyzing a gas and for continuously recording its composition. One difficult problem involved in devising such an analyzing and recording system consisted in securing a representative sample of the gas to be analyzed. This problem is particularly complicated because the gas had to be fed into the mass spectrometer at an exceedingly low pressure whereas the pressure in the gas line was relatively high. Also, it is often important that the flow of gas used for analysis be very small indeed. Thus the gas sample had to flow through a small space of some kind in order to provide the necessary pressure drop. As a result, the flow of gas tends to be attenuated and unless precautions are taken, the lighter components of the gas will diffuse through the necessarily small space at a greater velocity than the heavier components causing a sample to be fed into the mass spectrometer which is not representative of the gas to be analyzed.

Ordinary means of regulating such an attenuated stream of gas at the low pressure contemplated are insensitive, complicated, and ineffective. For instance, a conventional valve, even if it be of a delicate needle valve type, is unsatisfactory. Furthermore such a valve caused the gas mixture to fractionate, that is the composition of the gas changed as a result of its flow through the valve.

It is therefore a principal object of the present invention to provide improved means for accurately governing the flow of a small quantity of fluid from a comparatively high pressure area to a very low pressure area without appreciably changing the composition of the fluid.

It is another object of the invention to provide readily adjustable means for producing changes in the flow of small quantities of a gas or vapor, especially an attenuated gas flow to a very low pressure area.

It is still another and more specific object of this invention to provide delicately adjustable gripping means for constricting or releasing the walls of a passage conducting a flow of gas, and as a consequence regulating said flow; and to provide a length of conduit of small cross-section for increasing the velocity of the gas flow in order to avoid fractionation of the gas.

Finally, it is an object of the invention to provide practical apparatus for fulfilling the above purposes, especially a device comparatively simple to manufacture, easy to install and convenient to operate; and thereby to provide an adjustable capillary leak for supplying small quantities of a gas to a mass spectrometer at very low pressures without appreciably changing the composition of the gas thus supplied.

Other objects and advantages of this invention will appear in the following description and appended claims, reference being had to the accompanying drawings forming a part of this specification wherein like reference characters designate corresponding parts in the several views.

Figure 2:
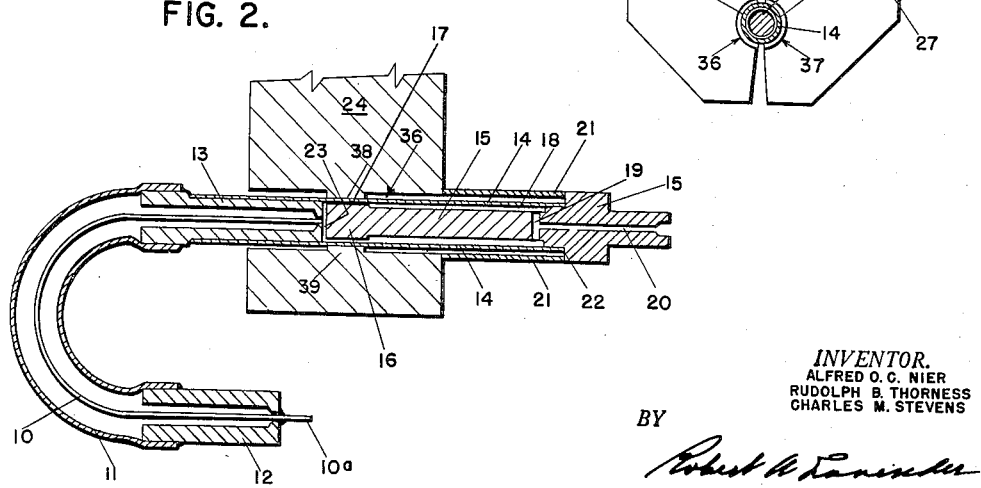
Fig. 2 is a central sectional view of a side elevation of one form of the present invention, a view of the lower portion only of one arm of the gripping means being shown.

Referring in particular to Fig. 2, the reference numeral 10 designates a capillary tube. This tube is situated within and is protected by a generally cylindrical cover 11 which is secured at its outer end to a connecting member 12. The cover may be soldered or otherwise suitably fastened to the connecting member 12, and the capillary tube 10 may project through an opening in the connector 12 as shown in Fig. 2. The other end of the capillary tube 10 is secured to a connector 13 and the cover 11 is soldered to the connector 13. The inner end of the tube 10 should be flush with but should not extend from the connector 13; and in fact, the laterally extending end face of the connector 13 must be very smooth and uniform. Any extension of the tube 10, excessive solder or surface irregularities should be smoothed out or removed during the manufacturing of the apparatus to provide at 23 a smooth flat face for the connector 13 and end of the tube 10. The need for this precaution will become evident hereinafter.

Reference numeral 14 indicates a generally tubular member formed of a resilient material or at least a material which is not easily deformable; preferably a metal tube is employed. For example, this tube may be a special hard drawn, close tolerance, smooth bore nickel tube. In the modification of the invention particularly illustrated this tube 14 had a ⅜" outside diameter and a 5/16" inside diameter. For reasons pointed out hereinafter, the tolerance for both the inside and the outside diameter must be kept within fairly close limits, especially the inside diameter, which, in the instance illustrated, was held to ±0.0005 inch. The dimension of the outside diameter need not be held so closely; but the tube should have a substantially uniform outside diameter throughout its length. In the form of the apparatus illustrated this diameter was held to a uniformity within ±0.0005 inch.

Within tube 14 there is provided an obstructing member or plug 15 which fills most of the interior passage of the tube with the exception of the gas-conveying channel system more fully described hereinafter. The plug 15 is provided with a head 16 which is very carefully dimensioned. It should be carefully machined so that a very small space indeed is provided between the outer walls of the head 16 and the inner walls of the tube 14. This space is shown in Fig. 2 at 17, but is exaggerated in this view for the purpose of providing a better illustration. In order that this small space will not become plugged or choked inadvertently by an irregularity in either the tube 14 or the plug 15, it is necessary that both of these parts be carefully machined, and for this reason the close tolerance of the inside diameter of the tube is necessary. Naturally the actual dimensions of the plug 15 will vary depending upon the size of the space 17 which is required or desired. In the particular form of the invention illustrated, the diameter of the head 16 was 0.001 inch smaller than the interior diameter of the tube. It will be noted that an annular channel 18 is defined by the plug 15 and the interior wall of tube 14. This channel runs generally parallel with the tube and the plug and communicates at its outer end with a generally crosswise channel 19 which is drilled or formed in the plug 15. This channel 19, in turn, communicates with a bore or generally longitudinally extending passage 20 also formed in the plug 15.

The various parts of the mechanism described above are preferably assembled as follows: although they may be assembled in any suitable manner to form the unified structure illustrated in Fig. 2. The capillary tube 10 is first soldered to the connector 13, and the face of the connector as well as the end of the tube 10 are treated to remove excess solder or other irregularities. Preferably the finishing operations are done by lapping or the like to provide a very smooth surface. Thereafter the cover 11 is soldered to the connector 13 and the tube 14 is also soldered to the connector 13, preferably in the same operation. The connector 12 is then soldered to the cover 11 and also to the capillary tube 10, preferably in a single operation. Thereafter, the spacer ring 21 is inserted, and the outer end of the plug 15 is soldered to the outer end of the spacer ring. The outer end of the plug 15 is also soldered to the tube 14 in the manner clearly indicated at 22. The inner end of the spacer ring 21 rests against the end faces of the arms 24 and 25 (see Fig. 2). It will be observed that the spacer ring positions the gripping means so that the projections 38 and 39 lie adjacent the space 17. The soldered connection shown at 22 is the sole connecting means for holding the plug 15 in place within the tube 14, since the inner head 16 of the plug 15 (theoretically at least) does not rest against the walls of the tube 14. As a practical matter, because the space 17 is so very small, being of the order of 0.0005 inch, the head 16 may touch the inner wall of the tube 14 although this is not very desirable.

A flow of fluid or gas through the present device takes place as a result of connecting the extending end 10a of the capillary tube 10 with a source of fluid; such, for instance, as a gas line, a reservoir, a tank, or the like. This connection may be accomplished by continuing the capillary tubing, by attaching the capillary tubing to a manifold or to a larger fluid conducting line, or by other suitable means. The gas or fluid flows through the length of capillary tubing to the space 23 which lies between the radially extending faces of the connector 13 and of the head 16 of the plug 15. This disc shaped space 23 is preferably small; and in the modification of the apparatus illustrated in the drawings it was approximately 0.0005 inch in width. Thus, as mentioned hereinbefore, it is necessary to very carefully machine and lap the faces of the connector 13 and of the head 16 of plug 15. The gas flows through the space 23 to a very small space 17 between the inner walls of the tube 14 and the outer walls of the head 16 of the plug 15. In the form of the invention illustrated the space 17 was of the order of 0.0002 inch in width. The gas then flows through the annular channel 18 to the cross channel 19 and finally flows through the bore 20. The channels 18, 19 and 20 are large as compared with the spaces 17 and 23.

It will be understood from considering this structure that very low pressures may be applied to a connecting line at the bore 20 and relatively high pressures applied at the capillary tube 10 and still effect a very small flow of gas or fluid through the device, since the gas or fluid is forced to flow through a devious group of interconnected channels, and through such very small spaces. This arrangement fulfills one purpose of the device which is to provide for a small gas flow from a relatively high pressure source to a relatively low pressure destination.

It has been found from experience, however, that occasionally despite all ordinary precautions the small space 23 and/or the still smaller space 17 will become more or less permanently plugged and interfere with the proper flow of gas through the device. In order to minimize these difficulties it may be desirable or necessary to mill a small slot in the face of the head 16 of the plug 15. Preferably this slot is approximately 0.001 inch deep and may be of the order of 0.030 inch wide. As a further precaution and to avoid the same difficulties, it may be desirable or necessary to reduce the length of the space 17 to a minimum. This may be done by slightly reducing the diameter of the extreme inner end of the head 16. For example, this portion of the head 16 may be turned down by approximately 0.001 inch to 0.002 inch to produce a little shoulder partway down the length of the head 16. This has the effect of producing a comparatively large channel between the head 16 and the tube 14 for a portion of the length of the head 16 and thereby reduces the length of the very small channel 17. The extent to which this small channel 17 is reduced in length, if it is so reduced at all, depends on the circumstances. In the particular device illustrated this reduction was so arranged as to leave the very small space 17 approximately ¼" in length.

It will be understood that the particular sizes mentioned hereinbefore for certain dimensions, especially for the spaces 17 and 23, were given by way of illustration and not of limitation. Such particular sizes were especially applicable for a very small gas flow to a very low pressure area. Under other circumstances such sizes could and should be altered to suit the purpose contemplated.

Figure 1:
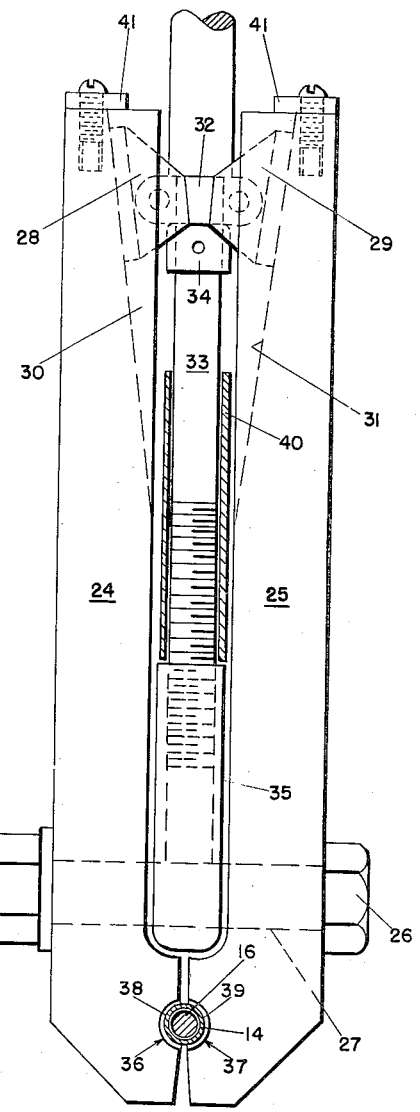
Fig. 1 is an end elevation, partially in section, showing in particular, one form of gripping means used in connection with the present invention.

The flow of gas through the present apparatus or device is regulated or governed by adjustably constricting or releasing the walls of the tube 14 adjacent the space 17. While any suitable means for squeezing or constricting the tube may be employed, provided such means may be readily controlled to give a delicate adjustment, a preferred mechanism for this purpose is illustrated in Fig. 1. This mechanism consists of a pair of arms or jaws 24 and 25 which are held together by a bolt 26. The tube 14 is adapted to be gripped by the arms 24 and 25 and each arm or jaw is provided with a generally semi-cylindrically shaped recess as shown at 36 and 37. These recesses confront each other to form a generally annular opening for receiving the tube 14 (see Fig. 1). This opening is shown in longitudinal section in Fig. 2. Preferably this recess is provided with a pair of centrally positioned extensions 38 and 39 projecting from their inner walls in the manner best illustrated in Fig. 2. Since these projections form the actual gripping means for the tube 14, they must be very carefully machined. In the particular modification of the invention illustrated, the diameter between the two projections was held to 0.005 inch less than the outside diameter of the tube 14, and the tolerance permitted was only ±0.0005 inch.

The opening 27 for the bolt 26 is dimensioned to permit a rocking movement of the arms 24 and 25 with respect to the bolt 26. In other words, the bolt 26 acts as a fulcrum about which the arms 24 and 25 may pivot so that these arms are forced apart above the bolt 26 and therefore are forced together below the bolt to squeeze or constrict the tube 14.

The mechanism for forcing the upper part of the jaws 24 and 25 apart consists of a pair of shoes 28 and 29, each of which is fitted for sliding movement in one of a pair of identically cut tapered or inclined grooves or slots shown at 30 and 31. The shoes 28 and 29 are held in spaced relationship by a connecting link 32 to which they are pivotally attached. The link 32 at least partially encloses or extends around the cylindrical stem 33. It will be noted that the upper portion of the stem 33 is larger in diameter than the lower portion thereof so that a shoulder is formed against which the upper portion of the link 32 rests. The link 32 is held in place by the collar 34 which is fixed to the stem 33 for rotation therewith.

The stem 33 is threaded into the yoke 35 which possesses an opening through which the bolt 26 passes in the manner illustrated in Fig. 1. Accordingly as the stem 33 is rotated to thread it into the fixed yoke 35, the link 32 moves downwardly forcing the shoes 28 and 29 downwardly in their inclined slots 30 and 31. This will force the upper part of the arms 25 and 24 apart which, in turn, forces the lower parts together to squeeze or constrict the tube 14. As the stem 33 is rotated in the other direction and therefore threads out of the yoke 35, the collar 34 will press against the link 32 and move the shoes 28 and 29 upwardly in their inclined slots 30 and 31. This of course will permit the arms 24 and 25 to move toward each other and release the walls of the tube 14 from the squeezing or constricting action. The resiliency of the tube 14 is relied upon to force the arms 24 and 25 together again once the shoes 28 and 29 have been raised. Since the space 17 is so very small, and since the walls of the tube 14 are actually constricted or squeezed a very little distance, the elastic limit of the tube is not reached or exceeded. Therefore the resiliency of the tube 14 may be employed for the purpose mentioned. It has been found from experience that even if a tube is squeezed or constricted for some little time this resiliency still exists; although in some cases it is possible that the tube will not return to its initial shape. Normally this is not necessary since adjustment of the device is possible so long as the tube remains resilient even though it may be partially deformed.

It will be noted that the present device is particularly adapted to provide a delicate adjustment of the flow of gas through the space 17. In the first place the arms 24 and 25 operate as levers which move about the bolt 26 as a fulcrum so that it is necessary to move the upper portion of the arms a relatively great distance in order to move the lower part a relatively small distance. This enables the arms to squeeze the tube 14 to a very slight extent if desired. As a further means of improving the delicacy of the adjustment, the stem 33 may be threaded into the yoke 35 with very fine threads, thus requiring a number of revolutions of the stem 33 to produce the necessary movement of the shoes 28 and 29. Still further, the inclined grooves 30 and 31 may be made quite steep, that is, they may differ from the vertical (as viewed in Fig. 1) by a relatively small amount so that it requires a relatively large path of travel of the shoes 28 and 29 to effect any appreciable movement of the arms 24 and 25.

All of these features cooperate or combine to provide for very careful and delicate clamping action of the arms 24 and 25. Naturally this provides for delicate adjustment of the apparatus which is necessary to effect fine regulation of a small quantity of gas passing through such a small space as that shown at 17. The sleeve 40 may be provided to operate as a stop to prevent excessive clamping of the tube 14; and the plates 41, 41 may be used as a stop to prevent the shoes 28 and 29 from being raised out of their grooves 30 and 31.

The apparatus described above comprises one way of carrying out the present invention. Generally speaking, this apparatus is best suited for supplying or feeding a very small quantity of gas from a relatively high pressure source to a very low pressure destination. Naturally this requires a very small space in the line at some point in order that the necessary pressure drop may be effected. Attempts to attain such a pressure drop by means known heretofore have produced an undesired fractionation of the gas. This fractionation takes place because the space through which the gas must flow is so small that a diffusive flow takes place in which the lighter components of the gas pass through the small space at a greater velocity than the heavier components. Furthermore this diffusion does not take place in a constant manner; and is affected by a number of conditions such as the actual size of the passage, the temperature, the pressure, the pressure drop across the device, the gases employed, and the concentration of the components of the gases. Furthermore, unless apparatus embodying these principles is utilized the amount of this diffusion and the results achieved by it will vary more or less uncontrollably; in other words, equilibrium conditions are not reached in any practicable manner.

In order to avoid this fractionation, the gas is first passed through a relatively long passage of small cross-section which accelerates it, that is, its velocity is increased. The first small quantity of gas which passes through the small opening will fractionate and build up a higher concentration of the heavier components on the upstream side of the constriction. However, in a very short time equilibrium will be reached establishing a definite gradient in which the concentration of the heavier components decrease in a definite manner down the length of the capillary tube. At equilibrium the gas travels at a high enough velocity down the tube toward the constriction so as to prevent back diffusion of the heavier components down the length of the tube counter to the flow of gas. Such back diffusion would take place if the gas were introduced at any reasonable velocity, from a large container or a relatively large conduit.

Once the aforementioned equilibrium conditions are established, it follows that the composition of the gas does not change as it passes through the narrow space or constriction. It also follows that unless the relatively long passage of small cross-section is employed, diffusion will continue and the heavier components will back diffuse so that the composition of the gas will continuously change on passing through the necessarily small space such as the openings 17 and/or 23. Accordingly, introducing the gas by the present apparatus permits a flow of gas through such a constricted space without fractionating.

Also, it is desirable and often necessary to provide means for adjusting the flow of gas through the mechanism. According to the present method this is accomplished by adjustably constricting or releasing the walls of the tube 14 in the manner explained, thereby increasing or decreasing the size of the space 17. Furthermore, the present method provides a practical and convenient means for securing the necessarily delicate adjustment required to regulate or govern the flow of such small quantities of gas as contemplated herein and at such low pressures.

Having illustrated and described our invention and having explained the principles thereof, it will be understood nevertheless that, within the scope of the appended claims, the invention may be practiced otherwise than specifically illustrated and described. Furthermore, the phraseology or terminology employed herein is for purposes of description and not of limitation; for it is not intended to limit the invention beyond the requirements to the prior art.

We claim:

1. Apparatus for regulating a flow of gas which comprises a hollow metal tube, an element in said tube for providing therein a relatively small gas conducting channel, a conduit leading to said channel and operatively connected therewith, and adjustable gripping means situated exteriorly of said tube juxtaposed with respect to said channel, said gripping means including a pair of pivoted jaws each having an inclined slot and a shoe movable in each of said slots for rocking said jaws to contact said tubing and thereby effect regulation of said flow.

2. Apparatus for regulating a flow of gas which comprises a metal tube, a plug in said tube dimensioned to provide a small space between its outer surface and the inner surface of the tube, a channel for conducting gas from said space, a length of capillary tubing leading to said space and operatively connected therewith, controllable gripping means situated exteriorly of said tube adjacent said space, said gripping means including a pair of pivoted jaws each having an inclined slot and including a shoe movable in each of said slots for rocking said jaws to contact said tubing and thereby effect regulation of said flow.

3. Apparatus for governing the flow of a fluid from a region of high pressure to a region of low pressure which comprises a length of metal tubing, a cylindrical element positioned therein to provide an annular fluid conducting channel in the tubing of reduced cross-sectional area, a capillary conduit interconnecting said high pressure region with said channel for increasing the velocity of the fluid flowing therethrough and adjustable gripping means situated exteriorly of said member astride said channel and bearing thereagainst for adjustably increasing and decreasing all portions of the cross-sectional area of said channel substantially equally.

ALFRED O. C. NIER.
RUDOLPH B. THORNESS.
CHARLES M. STEVENS.

REFERENCES CITED

The following references are of record in the file of this patent:

UNITED STATES PATENTS

| Number | Name | Date |
| --- | --- | --- |
| 113,016 | Bunce | Mar. 28, 1871 |
| 1,964,638 | Kreidel | June 26, 1934 |
| 2,037,949 | Tate | Apr. 21, 1936 |
| 2,285,974 | Huber | June 9, 1942 |
| 2,314,767 | Burrell | Mar. 23, 1943 |
| 2,402,729 | Buchanan | June 25, 1946 |